(No Model.)

C. W. SALADEE.
SPRING FOR VEHICLES.

No. 376,755. Patented Jan. 24, 1888.

Witnesses
Harry S. Rohrer,
Geo. H. Lamar.

Inventor
Cyrus W. Saladee
By his Attorneys
Niles & Greene

UNITED STATES PATENT OFFICE.

CYRUS W. SALADEE, OF CLEVELAND, OHIO.

SPRING FOR VEHICLES.

SPECIFICATION forming part of Letters Patent No. 376,755, dated January 24, 1888.

Application filed May 11, 1887. Serial No. 237,867. (No model.)

*To all whom it may concern:*

Be it known that I, CYRUS W. SALADEE, a resident of Cleveland, in the county of Cuyahoga and State of Ohio, have invented certain new and useful Improvements in Springs for Vehicles; and I do hereby declare the following to be a full, clear, and exact description of the invention, such as will enable others skilled in the art to which it pertains to make and use the same.

My invention relates to improvements in flexion-springs for vehicles, and is fully described, explained, and claimed in this specification, and shown in the accompanying drawings, in which—

Figure 1:
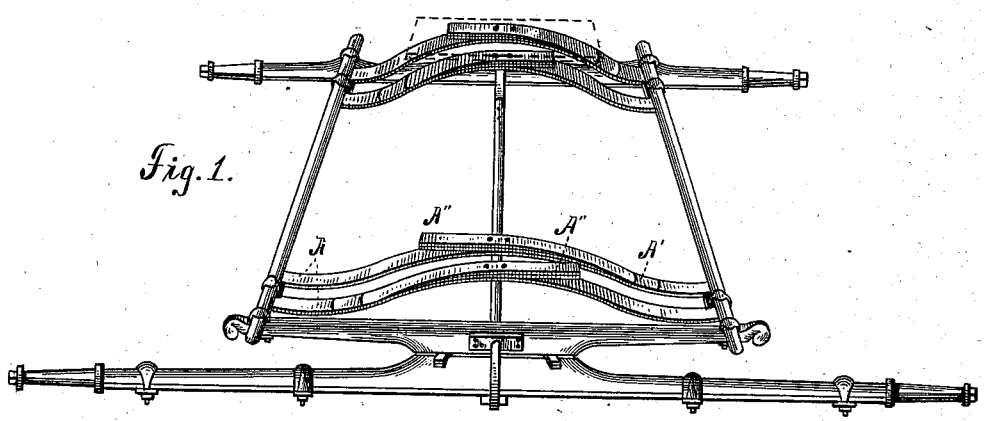
Figure 2:
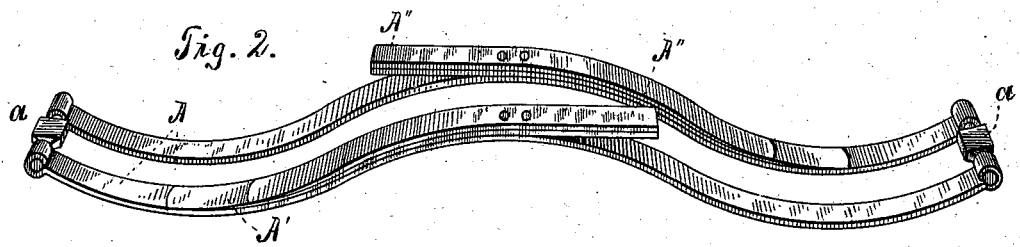

Figure 1 is a perspective view of a gear provided with springs embodying my improvements, and Fig. 2 is a perspective view of a detached pair of springs similar to those shown in Fig. 1.

In the views the springs are shown arranged in pairs, each pair consisting of two similar springs placed side by side and parallel to each other, and each of said similar springs being made up of a preferably-arched main plate, A, and one or more superposed plates, A', resting thereon.

Each of the main plates A is provided at each end with a suitable eye or knuckle, a, by means of which it may be pivotally suspended from opposite parts of the running-gear of a vehicle, and the superposed plates A', resting on the main plate, are of such shape as to conform substantially to the upper surface thereof at one side of its highest point, but extend on the opposite side to said point in a horizontal plane tangent to the curve of the main plate. The horizontal extensions A" of the two members A' in each pair lie on opposite sides of the central line thereof, and are formed with suitably-placed bolt-holes, by means of which they may be attached directly to a vehicle-body or to a spring-bar adapted to be fastened to the body. In either case they form a base of support for the body, symmetrical with reference to its center, transmitting its weight equally to all the parts of the two parallel springs, and reducing its side motion to a minimum.

As illustrated in Fig. 1, two pairs of the springs described above are suspended from the side bars of an ordinary side-bar gear, shackles or knuckles of any desired construction being employed, and the two pairs of springs being placed near the opposite ends of the gear. The combination of these springs with side bars constitutes, however, no essential part of my invention, as I contemplate using them with running-gears of various forms, suspending them in each case from such parts of the gear as may be convenient and practicable. The springs illustrated in the drawings are of the reverse curve or compensating form, and springs of this form are preferable, since their ends may be connected with the supporting parts of the gear by ordinary knuckle-joints instead of swinging shackles. I do not, however, intend to limit my invention to the employment of springs of this or any other special form.

It will usually be found preferable to connect the two springs of each pair, either by attaching their extensions A" to a single spring-bar or by connecting their corresponding ends to the supporting part of the gear by a single knuckle or shackle. It is evident, however, that the two springs of each pair may be independent of each other, so far as their construction and attachment to the gear is concerned, each of said springs being an integral and separate structure.

Having now described and explained my invention, what I claim as new, and desire to secure by Letters Patent, is—

1. A flexion-spring for vehicles, consisting of a curved main plate provided at its ends with means for suspending it from the running-gear and one or more plates superposed upon said main plate and conforming substantially to the curve thereof at one side of its center, but extending on the opposite side of said center in a plane tangent to said curve, substantially as and for the purpose set forth.

2. A flexion-spring for vehicles, consisting of an arched main plate provided at its ends with eyes for its suspension and one or more plates superposed upon said arched plate and conforming thereto at one side of its highest point, but having on the opposite side of said point a horizontal extension provided with means for attachment to the body or spring-bar of the vehicle.

3. A flexion-spring for vehicles, consisting of the arched main plate A, having eyes a at its ends, and the superposed plates A', having horizontal extensions A'', substantially as and for the purpose set forth.

4. A duplex flexion-spring for vehicles, consisting of two similar main plates parallel to each other and provided at their ends with eyes for their suspension and plates superposed on said main plates and having approximately horizontal extensions lying on opposite sides of the central line of the spring and adapted to be attached to the body or spring-bar of the vehicle, substantially as and for the purpose set forth.

5. The combination, with the side bars of a running-gear, of a duplex flexion-spring consisting of two parallel arched main plates, A, having their ends pivotally connected with the side bars, and the plates A', superposed on the main plate A, and having the opposite extensions A'', adapted to form a support for a vehicle-body, substantially as and for the purpose set forth.

In testimony whereof I have signed this specification in the presence of two subscribing witnesses.

CYRUS W. SALADEE.

Witnesses:
J. H. DEMPSEY,
L. F. LEUER.